(12) United States Patent
Aggarwal et al.

(10) Patent No.: US 7,890,510 B2
(45) Date of Patent: Feb. 15, 2011

(54) METHOD AND APPARATUS FOR ANALYZING COMMUNITY EVOLUTION IN GRAPH DATA STREAMS

(75) Inventors: Charu C. Aggarwal, Mohegan Lake, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 11/243,727

(22) Filed: Oct. 5, 2005

(65) Prior Publication Data

US 2007/0288465 A1    Dec. 13, 2007

(51) Int. Cl.
G06F 7/00 (2006.01)
G06N 5/00 (2006.01)

(52) U.S. Cl. ............... 707/737; 707/736; 707/725; 706/12; 706/20; 706/45; 706/46; 726/22; 726/23

(58) Field of Classification Search ............ 707/2, 707/6, 101; 704/10; 709/224; 715/526, 715/853
See application file for complete search history.

(56) References Cited

U.S. PATENT DOCUMENTS

| | | | | |
|---|---|---|---|---|
| 5,339,385 | A * | 8/1994 | Higgins | 704/246 |
| 6,092,065 | A * | 7/2000 | Floratos et al. | 707/6 |
| 6,263,334 | B1 * | 7/2001 | Fayyad et al. | 707/737 |
| 6,801,229 | B1 * | 10/2004 | Tinkler | 715/853 |
| 7,373,389 | B2 * | 5/2008 | Rosenbaum et al. | 709/207 |
| 2003/0023715 | A1 * | 1/2003 | Reiner et al. | 709/224 |
| 2003/0229635 | A1 * | 12/2003 | Chaudhuri et al. | 707/6 |
| 2004/0024756 | A1 * | 2/2004 | Rickard | 707/3 |
| 2004/0122803 | A1 * | 6/2004 | Dom et al. | 707/3 |
| 2004/0133555 | A1 * | 7/2004 | Toong et al. | 707/2 |
| 2005/0171760 | A1 * | 8/2005 | Tinkler | 704/10 |
| 2005/0256949 | A1 * | 11/2005 | Gruhl et al. | 709/223 |
| 2006/0031203 | A1 * | 2/2006 | Rosenbaum et al. | 707/3 |
| 2006/0075335 | A1 * | 4/2006 | Gloor | 715/526 |
| 2006/0080422 | A1 * | 4/2006 | Huberman et al. | 709/223 |
| 2006/0106847 | A1 * | 5/2006 | Eckardt et al. | 707/101 |

OTHER PUBLICATIONS

Han et al., A Framework for Clustering Evolving Data Streams, 2003.*
Charu et al., Online Analysis of Community Evolution in Data Streams, Apr. 2005.*
C. Cortes et al., "Communities of Interest," Proceedings of Intelligent Data Analysis, 10 pages, 2001.

(Continued)

*Primary Examiner*—Vincent Boccio
*Assistant Examiner*—Huen Wong
(74) *Attorney, Agent, or Firm*—Kenneth Corsello; Ryan, Mason & Lewis, LLP (57) ABSTRACT

Improved techniques are disclosed for detecting patterns of interaction among a set of entities and analyzing community evolution in a stream environment. By way of example, a technique for processing data from a data stream includes the following steps/operations. A data point of the data stream representing an interaction event is obtained. An interaction graph is updated on-line based on the data point representing the interaction event. The updated interaction graph is stored in a nonvolatile memory. An interaction evolution is determined off-line from the updated interaction graph stored in the nonvolatile memory.

21 Claims, 6 Drawing Sheets

OTHER PUBLICATIONS

C. Cortes et al., "Computational Methods for Dynamic Graphs," Journal of Computational and Graphical Statistics, pp. 1-22, Nov. 24, 2003.

D. Gibson et al., "Inferring Web Communities from Link Topology," Proceedings of the 9th ACM Conference on Hypertext and Hypermedia, 10 pages, 1998.

D. Kempe et al., "Maximizing the Spread of Influence through a Social Network," ACM KDD Conference, 10 pages, 2003.

Jon M. Kleinberg, "Authoritative Sources in a Hyperlinked Environment," Journal of the ACM, vol. 46, No. 5, pp. 604-632, Sep. 1999.

R. Kumar et al., "On the Bursty Evolution of Blogspace," Proceedings of the WWW Conference, 9 pages, May 2003.

R. Kumar et al., "Trawling the Web for Emerging Cyber-Communities," Proceedings of the 8th WWW Conference, 21 pages, 1999.

N. Imafuji et al., "Finding a Web Community by Maximum Flow Algorithm with HITS Score Based Capacity," DASFAA, 6 pages, 2003.

M. Toyoda et al., "Extracting Evolution of Web Communities from a Series of Web Archives," Hypertext, 10 pages, 2003.

C.C. Aggarwal, "A Framework for Diagnosing Changes in Evolving Data Streams," SIGMOD, Jun. 2003, 12 pages, California.

C.C. Aggarwal et al., On Demand Classification of Data Streams, ACM KDD, 2004, Aug. 2004, 6 pages, Washington.

R. Agrawal et al., "Fast Algorithms for Mining Association Rules," Proceedings of the 20th VLDB Conference, 1994, 13 pages, Chile.

P. Domingos et al., "Mining High-Speed Data Streams," ACM SIGKDD Conference, 2000. 10 pages.

G. Hulten et al., "Mining Time Changing Data Streams," ACM KDD Conference, 2001, 10 pages.

* cited by examiner

METHOD AND APPARATUS FOR ANALYZING COMMUNITY EVOLUTION IN GRAPH DATA STREAMS

This invention was made with Government support under Contract No.: H98230-04-3-0001 awarded by the U.S. Department of Defense. The Government has certain rights in this invention.

FIELD OF THE INVENTION

This present invention generally relates to data processing techniques and, more particularly, to techniques for detecting patterns of interaction among a set of entities and analyzing community evolution in a stream environment.

BACKGROUND OF THE INVENTION

Techniques for processing data streams have gained importance in recent years because of the great ease with which stream data can be collected due to hardware technology advances. There is much existing literature on the extension of data mining techniques to the case of data streams.

A known problem in the data stream environment is that of detecting patterns of interaction among a set of entities operating in such an environment. A convenient way to model entity interaction relationships is to view them as graphs in which the nodes correspond to entities and the edges correspond to the interactions among the nodes. The weights on these edges represent the level of interaction between the different participants.

For example, in the case when the nodes represent interacting entities in a business environment, the weights on the edges among these entities could represent the volume of business transactions. A community of interaction may therefore be defined to be a set of entities with a high degree of interaction among the participants.

The problem of finding communities in graphs has been discussed in the literature, see, e.g., C. Cortes, D. Pregibon and C. Volinsky, "Communities of Interest," Proceedings of Intelligent Data Analysis, (2001); C. Cortes, D. Pregibon and C. Volinsky, "Computational Methods for Dynamic Graphs," Journal of Computational and Graphical Statistics," vol. 2, pp. 950-970, (2003); D. Gibson, J. Kleinberg and P. Raghavan, "Inferring Web Communities from Link Topology," Proceedings of the 9th ACM Conference on Hypertext and Hypermedia, (1998); D. Kempe, J. Kleinberg and E. Tardos, "Maximizing the Spread of Influence Through a Social Network," ACM KDD Conference, (2003); J. Kleinberg, "Authoritative Sources in a Hyperlinked Environment," ACM SODA Conference, (1998); R. Kumar, J. Novak, P. Raghavan and A. Tomkins, "On the Bursty Evolution of Blogspace," Proceedings of the WWW Conference, (2003); S. Rajagopalan, R. Kumar, P. Raghavan and A. Tomkins, "Trawling the Web for emerging cyber-communities," Proceedings of the 8th WWW conference, (1999); N. Imafuji and M. Kitsuregawa, "Finding a Web Community by Maximum Flow Algorithm with HITS Score Based Capacity," DASFAA, pp. 101-106, (2003); and M. Toyoda and M. Kitsuregawa, "Extracting evolution of web communities from a series of web archives," Hypertext, pp. 28-37, (2003).

Since most of the existing techniques are designed for applications such as the web ("web" commonly refers to the World Wide Web), they usually assume a gradually evolving model for the interaction. Such techniques are not very useful for a fast stream environment in which the entities and their underlying relationships may quickly evolve over time.

Examples of environments where the interaction among different entities can rapidly evolve over time include environments where entities comprise sets of businesses which interact with one another, sets of co-authors in a dynamic bibliography database, or the entities could be hyperlinks from web pages.

Accordingly, there is a need for improved techniques for detecting patterns of interaction among a set of entities and analyzing community evolution in a stream environment.

SUMMARY OF THE INVENTION

Principles of the invention provide improved techniques for detecting patterns of interaction among a set of entities and analyzing community evolution in a stream environment.

By way of example, one aspect of the invention comprises a technique for processing data from a data stream comprising the following steps/operations. A data point of the data stream representing an interaction event is obtained. An interaction graph is updated on-line based on the data point representing the interaction event. The updated interaction graph is stored in a nonvolatile memory. An interaction evolution is determined off-line from the updated interaction graph stored in the nonvolatile memory.

Further, the step/operation of updating the interaction graph and storing the updated interaction graph may be performed incrementally.

Still further, the step/operation of determining off-line the interaction evolution may further comprise clustering data represented in the updated interaction graph stored in the nonvolatile memory.

The clustering step/operation may further comprise using at least one user-specified parameter to construct one or more clusters. The at least one user-specified parameter may comprise a predefined horizon.

The clustering step/operation may further comprise identifying one or more graphical snapshots based on the predefined horizon and using the one or more graphical snapshots to construct the one or more clusters.

The clustering step/operation may further comprise using one or more seeds as representative points of the one or more clusters.

The clustering step/operation may further comprise using one or more biases to compute distances between the one or more seeds.

The clustering step/operation may further comprise computing the one or more biases using a function of a fraction of positive weight edges in the graph.

The clustering step/operation may further comprise using a normalized differential graph to construct the one or more clusters.

Advantageously, principles of the invention address the problem of online change detection (e.g., trends) in a large set of interacting entities. Such trends may include the gradual formation and dissolution of different communities of interaction in a graphical data stream. Principles of the invention may be used to focus on the case where the interacting entities are received in the form of a fast data stream of interactions. In such cases, a user may wish to perform repeated exploratory querying of the data for different kinds of user-defined parameters. This is difficult to perform in a fast data stream because of the one-pass constraints on the computations.

Thus, illustrative principles of the invention provide an online analytical processing framework which separates out on-line data summarization from off-line exploratory querying. One advantageous result is a method which provides the ability to perform exploratory querying without compromising on the quality of the results.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary data processing system architecture. It should be understood, however, that the invention is not limited to use with any particular system architecture. The invention is instead more generally applicable to any data processing system in which it would be desirable to detect patterns of interaction among a set of entities and analyze community evolution in a stream environment.

As used herein the phrase "data stream" may generally refer to a continuous sequence of data over a given time period. By way of example, such a sequence of data may be generated by a real-time process which uses continuous data storage. For example, the data stream could result from businesses which electronically interact with one another, co-authors in a dynamic bibliography database, or hyperlinks from web pages. In each of these cases, the interaction among different entities can rapidly evolve over time. However, it is to be understood that principles of the invention are not limited to any particular type of data stream.

Also, by the term "on-line," it is generally meant that an operation on the data stream is being performed in real-time, e.g., at a time when data is being actively received by the processing server from its originating source. Thus, "off-line" generally refers to the situation when an operation on the data stream is not being performed in real-time, e.g., at a time when data is not being actively received by the processing server from its originating source. However, principles of the invention may apply to other definitions of "on-line" and "off-line." For example, "on-line" may refer to operations performed from data stored in volatile memory (e.g., main memory associated with a server), while "off-line" may refer to operations performed on data stored in nonvolatile memory (e.g., disk memory associated with a server).

Principles of the invention realize that it would be desirable to provide a user the exploratory capability to query for communities over different time horizons. Recall that a community of interaction is defined to be a set of entities with a high degree (e.g., a predetermined level) of interaction among the participants, and that a convenient way to model entity interaction relationships is to view them as graphs in which the nodes correspond to entities and the edges correspond to the interactions among the nodes. The weights on these edges represent the level of interaction between the different participants.

Since individual points in the data streams typically cannot be processed more than once (since a data stream contains a prohibitively large number of data points), principles of the invention provide a framework which separates out the offline exploratory algorithms from the online stream processing part. The on-line stream processing framework creates summaries of the data which can then be further processed for exploratory querying. Principles of the invention focus on an on-line analytical processing (OLAP) approach for providing offline exploratory capabilities to users in performing change detection across communities of interest over different time horizons.

Some examples of exploratory queries in which a user may be interested are as follows:

(1) Find the communities with substantial increase in interaction level in the interval (t−h, t). We refer to such communities as expanding communities.

(2) Find the communities with substantial decrease in interaction level in the interval (t−h, t). We refer to such communities as contracting communities.

(3) Find the communities with the most stable interaction level in the interval (t−h, t).

We note that the process of finding an expanding or contracting community needs to be carefully designed in order to normalize for the behavior of the community evolution over different time horizons. For example, consider a data stream in which two entities n1 and n2 share a high level of interaction in the period (t−h, t). This alone does not mean that the interaction level between n1 and n2 is stable especially if these entities had an even higher level of interaction in the previous period (t−2h, t−h). Thus, a careful model needs to be constructed which tracks the behavior of the interaction graph over different time horizons in order to understand the nature of the change.

Principles of the invention provide methods for online analysis of community detection in data streams. More particularly, in an illustrative embodiment, an OLAP-based framework is provided in which the online preprocessing of the data stream is separated from the offline querying of the stream. Thus, the user can have the flexibility to query these summaries in an interactive way in order to find detailed information about the communities in the most relevant horizons. Principles of the invention provide a clustering algorithm which can determine clusters of interactions with the most significant change. This includes information about the disposition of the communities in terms of their expansion or contraction. Thus, principles of the invention provide a general framework for online analysis of data streams.

We now illustratively describe an overall interaction model among the different entities. We will also describe the process of online summarization of the data stream.

This interaction model is stored as a graph $G=(N, A)$, in which each node i in node set N corresponds to an entity. The edge set A comprises edges $(i, j)$, such that i and j are nodes drawn from N. Each edge $(i, j)$ represents an interaction between the entities i and j. Each edge $(i, j)$ also has a weight $w_{ij}(t)$ associated with it. This weight corresponds to the number of interactions between the entities i and j.

For example, when the interaction model represents a bibliography database, the nodes could represent the authors and the weights on the edges could represent the number of publications on which the corresponding authors occur together as co-authors. As new publications are added to the database the corresponding weights on the individual edges are modified. It is also possible for new nodes to be added to the data as new authors are added to the original mix. In this particular example, the weight on each edge increases by one, each time a new co-authorship relation is added to the database. However, in many applications such as that involving business interaction, the weight added in each iteration can be arbitrary, and in some cases even negative.

In order to model the corresponding stream for this interaction model, we assume that a current graph G(t)=(N(t), A(t)) exists which represents the history of interactions at time t. At time (t+1), new additions may occur to the graph G(t). Subsequently, each new arrival to the stream contains two elements:

(1) An edge (i, j) corresponding to the two entities between whom the interaction has taken place; and (2) An incremental weight $\Delta w_{ij}(t)$ illustrating the additional interaction which has taken place between entities i and j at time t.

We refer to the above pair of elements as representative of an interaction event. An interaction event represents an interaction between two entities. For example, it may be a phone call between two people, a chat messaging between two computers, a business transaction between two corporations, or a paper writing interaction between two authors.

We note that the nodes i, j, or the edge (i, j) may not be present in N(t) and A(t), respectively. In such a case, the node set N(t) and edge set A(t) need to be modified to construct N(t+1) and A(t+1), respectively. In the event that a given edge does not exist to begin with, the original weight of (i, j) in G(t) is assumed to be zero. Also, in such a case, the value of the edge set A(t+1) is augmented as follows:

$$A(t+1) = A(t) \cup \{(i,j)\}$$

In the event that either the nodes i or j are not present in N(t), the corresponding node set needs to be augmented with the new node(s). Furthermore, the weight of the edge (i, j) needs to be modified. If the edge (i, j) is new, then the weight of edge (i, j) in G(t+1) is set to $\Delta w_{ij}$. Otherwise, we add the incremental weight $\Delta w_{ij}$ to the current weight of edge (i, j) in G(t). Therefore, we have:

$$w_{i,j}(t+1) = w_{i,j}(t) + \Delta w_{i,j}(t)$$

We assume that the set of interaction events received at time t are denoted by E(t). In each iteration, the stream maintenance algorithm of the invention adds the interaction events in E(t) to G(t) in order to create G(t+1). At each given moment in time, the current graph of interactions G(t) is maintained in main memory. In addition, the graph of interactions is periodically stored on disk or some other form of nonvolatile memory. These periodically stored entities on the disk can be used for the purpose of offline analysis. The offline analysis is performed by constructing a normalized differential graph and using it in order to determine the salient trends in the community of interactions.

The differential graph is generated over a specific time horizon $(t_1, t_2)$ over which the user would like to test the behavior of the data stream. The differential graph is defined over the interval $(t_1, t_2)$ and is defined as a fraction of the interactions over that interval by which the level of interaction has changed during the interval $(t_1, t_2)$. In order to generate the differential graph, the normalized graph is constructed at the times $t_1$ and $t_2$. The normalized graph G(t)=(N(t), A(t)) at time t is denoted by G'(t) notation, and contains exactly the same node and edge set, but with different weights.

Let $W(t) = \Sigma_{(i,j) \, in \, A} w_{ij}(t)$ be the sum of the weights over all edges in the graph G(t). Then, the normalized weight $w_{ij}(t)$ is defined as $w_{ij}(t)/W(t)$. We note that the normalized graph basically comprises the fraction of interactions over each edge. Once the normalized graph has been constructed, it can be used to generate the differential graph by subtracting out the corresponding edge weights.

Once the differential graph has been constructed, we would like to find clusters of nodes which show a high level of evolution. It is realized that determining the subgraphs which have a high level of evolution can be a difficult issue. However, advantageously, once the differential graph has been constructed, principles of the invention use clustering on the nodes to generate the final sets of communities. Each cluster is associated with a bias which explains whether this is an expanding or contracting community.

Figure 1:
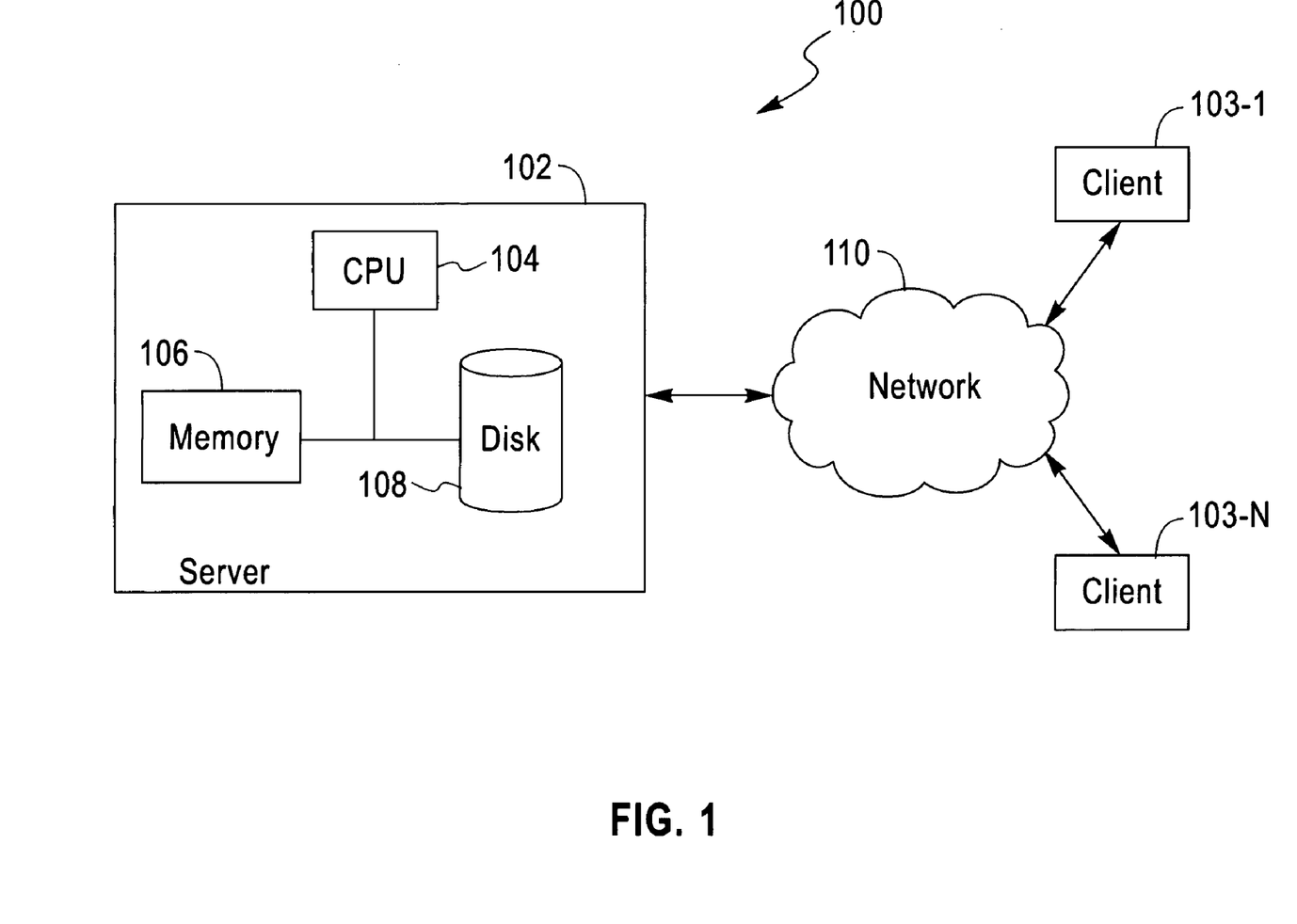
FIG. 1 illustrates a server architecture and network environment in accordance with which data stream processing may be employed, according to an embodiment of the present invention.

Referring initially to FIG. 1, a block diagram illustrates a server architecture and network environment in accordance with which data stream processing may be employed, according to an embodiment of the present invention.

As illustrated, an exemplary system 100 comprises a server 102. The server 102 may comprise a central processing unit (CPU) 104 coupled to a main memory 106 (volatile memory) and a disk 108 (nonvolatile memory). Multiple clients 103-1 through 103-N from which data to be processed may be collected interact with the server 102 over a communication network 110. Depending on the particular application, the clients could be business entities in an e-commerce environment. It is to be appreciated that the network may be a public information network such as, for example, the Internet or World Wide Web, however, the clients and server may alternatively be connected via a private network, a local area network, or some other suitable network. Also, it is to be understood that server 102 may receive data streams to be processed from any other source or sources.

The on-line and off-line operations/computations of the invention are performed at the CPU 104 on the server 102. It is to be understood that one or more of the client devices may supply data to be processed to server 102. However, all or portions of the data to be processed may already be available at the server (e.g., on disk 108), or may be accessible by the server. The main memory 106 may be used in order to store some or all of the intermediate results performed during the operations/computations. Results of these operations/computations may be returned to a requesting client device and/or provided to some other destination.

In one preferred embodiment, software components including instructions or code for performing the methodologies of the invention, as described herein, may be stored in one or more memory devices described above with respect to the server and, when ready to be utilized, loaded in part or in whole and executed by the CPU.

Furthermore, in accordance with one preferred embodiment, data is received over the network 110 in terms of pairs of interactions. This data is used to construct the interaction graph and process it to construct the relevant edges in the data. The summary structure is stored on the disk, and is used by the CPU for finding the relevant expanding or contracting communities.

Figure 2:
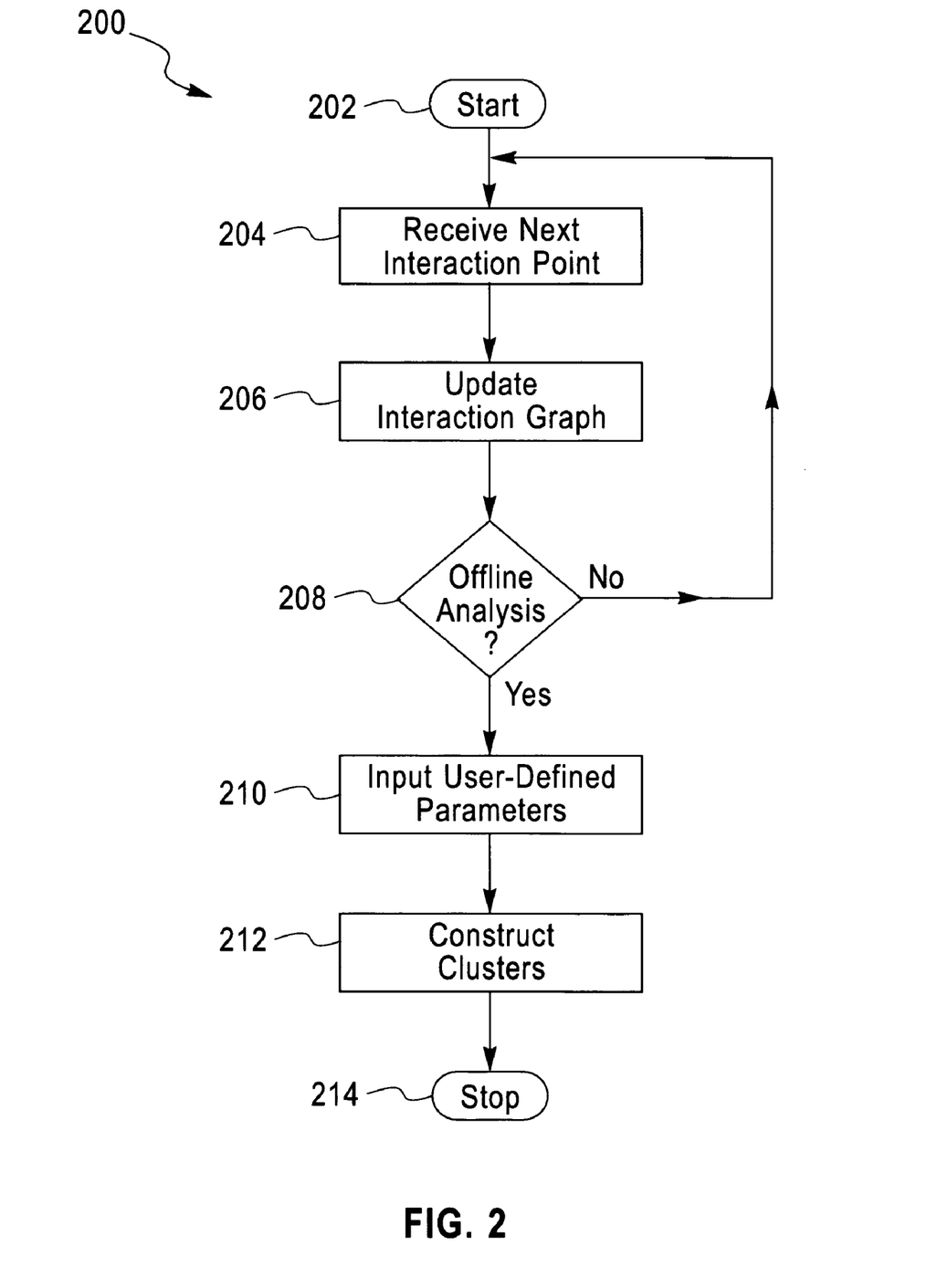
FIG. 2 illustrates a combined on-line and off-line process for mining a data stream, according to an embodiment of the invention.

Referring now to FIG. 2, a flow diagram illustrates a combined on-line and off-line process 200 for mining a data stream, according to an embodiment of the invention. More particularly, the illustrated process includes both the off-line process for constructing the interaction graph as well as the on-line process for using it to construct clusters.

The combined process starts at block 202. In step 204, the process receives an interaction point in the data stream. An interaction point represents an interaction event and, as explained above, comprises an edge corresponding to the two entities between whom the interaction has taken place, and an incremental weight illustrating the additional interaction which has taken place between entities at a given time. In step 206, the process updates the interaction graph and optionally stores the interaction graph to disk (e.g., disk 108 of FIG. 1). This is the online process of maintaining the data stream, and is described in more detail below in the context of FIG. 3.

Then, it is decided in step 208 whether or not to move to the offline analysis phase. In the event that it is decided not to move to the offline analysis phase, the process returns to step 204 to receive the next interaction point. If it is decided to proceed with offline analysis, in step 210, the process receives user-defined parameters as input. These user-defined parameters are used to construct the clusters in step 212. The construction of such clusters is described in more detail below in the context of FIG. 4. The process ends at block 214.

Figure 3:
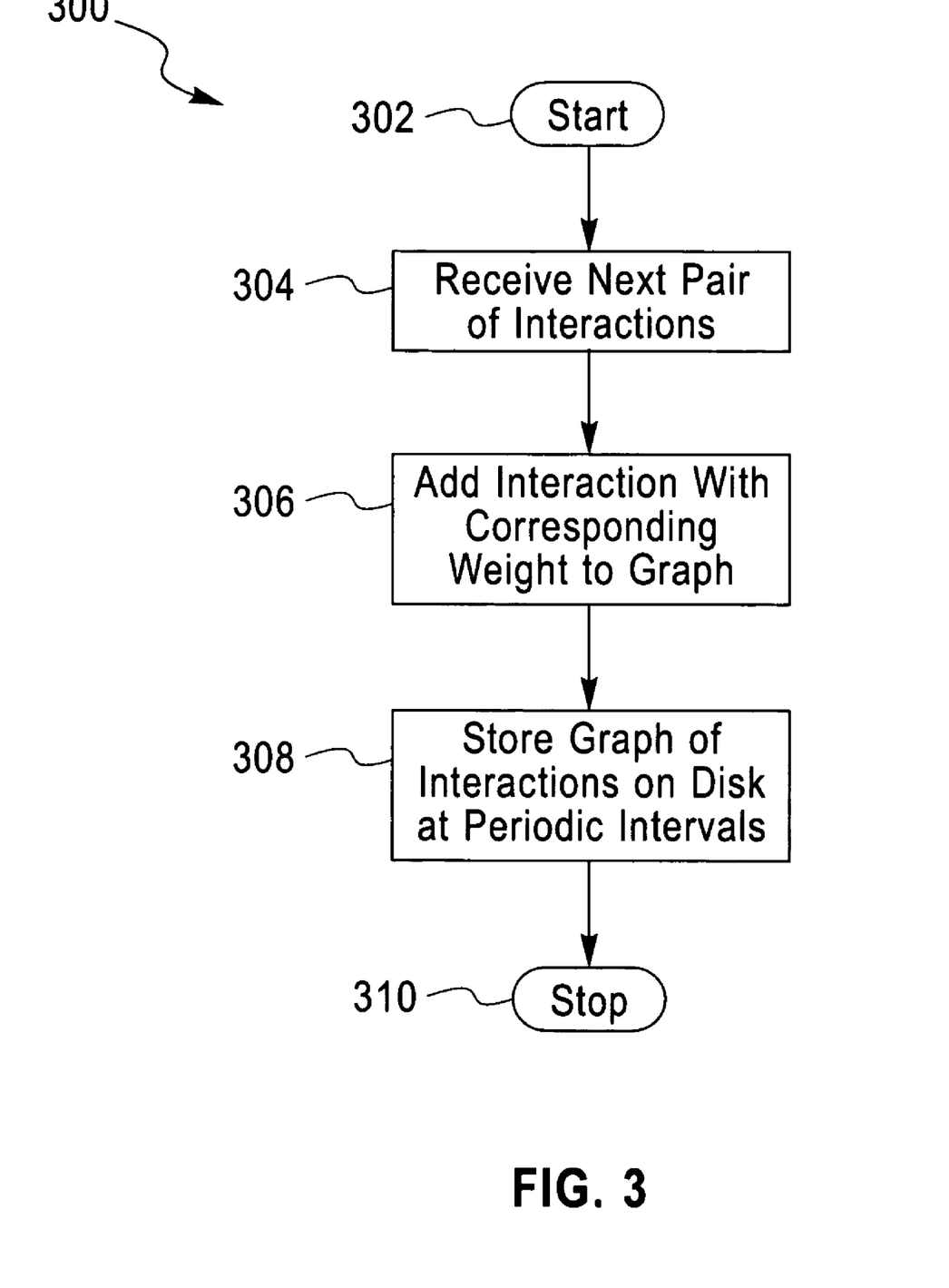
FIG. 3 illustrates a process for on-line maintenance of a data stream, according to an embodiment of the invention.

Referring now to FIG. 3, a flow diagram illustrates a process 300 for on-line maintenance of a data stream, according to an embodiment of the invention. More particularly, FIG. 3 illustrates the online process for processing and storing the interactions. This process corresponds to step 206 of FIG. 2.

The process starts at block 302. In step 304, the process receives the next interaction pair, e.g., next interaction point in the data stream (edge plus corresponding incremental weight). In step 306, the process adds the next interaction pair with corresponding weight to the graph. The graph of interactions is stored to disk at periodic intervals in step 308. The process ends at block 310. We note that the periodic intervals at which the graph is stored can be varied in order to optimize the storage and representation of the data. For example, a geometric time interval can be chosen in which snapshots are stored at intervals of a week, a month, and year, and so on.

Figure 4:
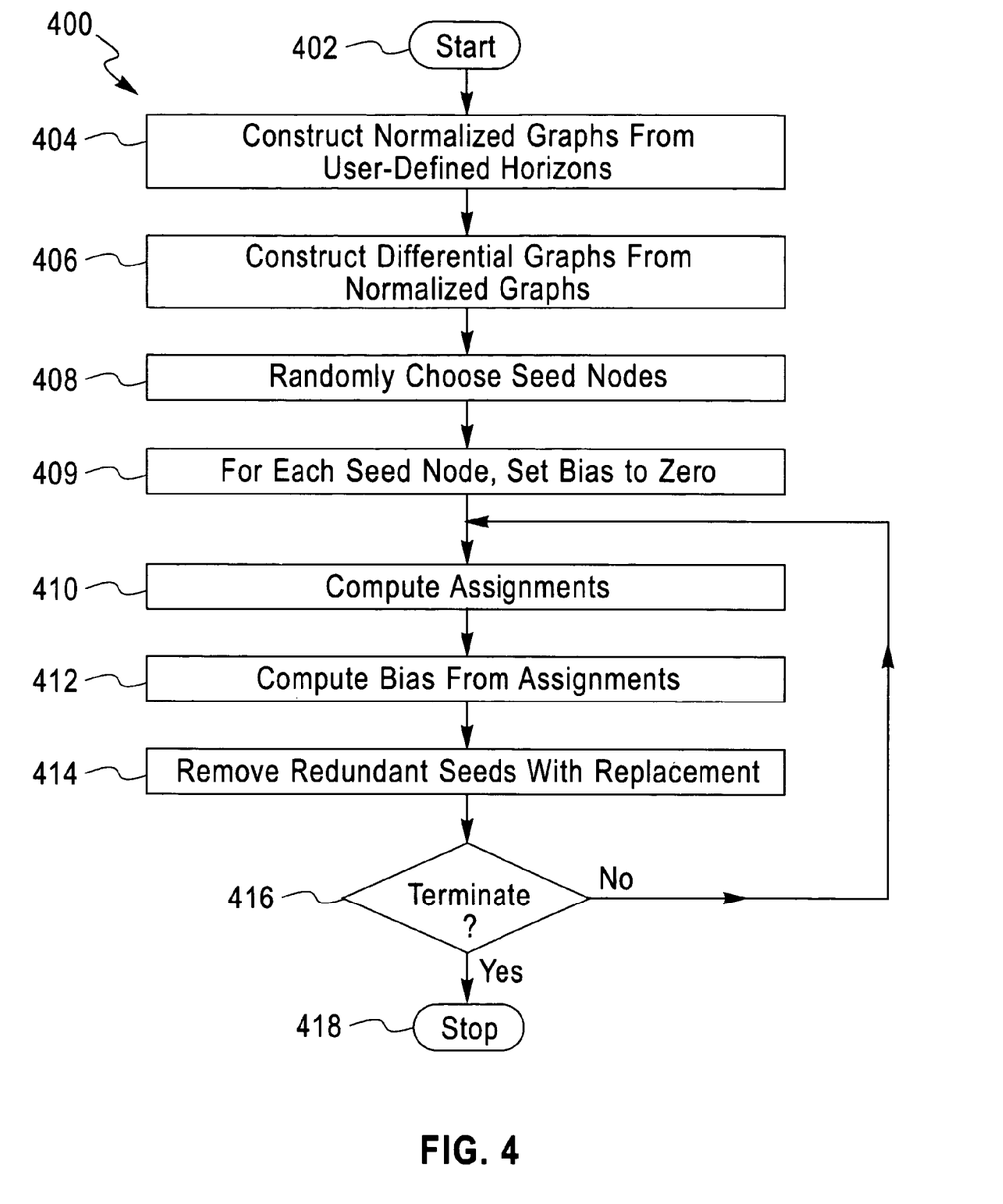
FIG. 4 illustrates a process for off-line construction of clusters from an evolving data stream based on user-defined parameters, according to an embodiment of the invention.

Referring now to FIG. 4, a flow diagram illustrates a process 400 for off-line construction of clusters from an evolving data stream based on user-defined parameters, according to an embodiment of the invention. More particularly, FIG. 4 illustrates the process of construction of a differential graph from user-defined horizons. This process corresponds to step 212 of FIG. 2.

The overall approach comprises two steps: (1) construction of the normalized differential graph from the stored data on disk; and (2) use of this stored data in order to perform the off-line analysis.

The process starts at block 402. In step 404, the process constructs normalized graphs from user-defined horizons. User-defined horizons are specified time intervals over which the user wishes to perform the offline analysis. A normalized graph is defined by dividing each edge weight by the sum of all the edge weights. In step 406, the process constructs the differential graphs from the normalized graphs. The differential graph is constructed by picking two snapshots (instances) of the normalized graph, and subtracting one snapshot from the other. That is, as explained above, since the normalized graph basically comprises the fraction of interactions over each edge, once the normalized graph has been constructed, it can be used to generate the differential graph by subtracting out the corresponding edge weights.

In step 408, seed nodes are randomly chosen. In step 409, for each seed node, a bias value is initialized to zero. It is to be understood that a bias bit takes on the value of 1, −1 or 0 depending upon whether the community is considered to be expanding, contracting or neutral. Initially all communities are assumed to be neutral and therefore the bias bits are set to zero.

In step 410, the process computes the assignments of graph points (nodes in the graph) to the seed nodes. The process of assignment is described in more detail below in the context of FIG. 5. These assignments are used for the purpose of computing biases of the seed nodes. Thus, in step 412, the process computes the bias (updates the bias from an initial value of zero) from the assignments. This step is described in more detail below in the context of FIG. 6. In step 414, the process removes redundant seeds with replacement. In step 416, the process checks if it should terminate. If yes, the process ends at block 418. If not, then the process returns to step 410 of computing the assignments.

Figure 5:
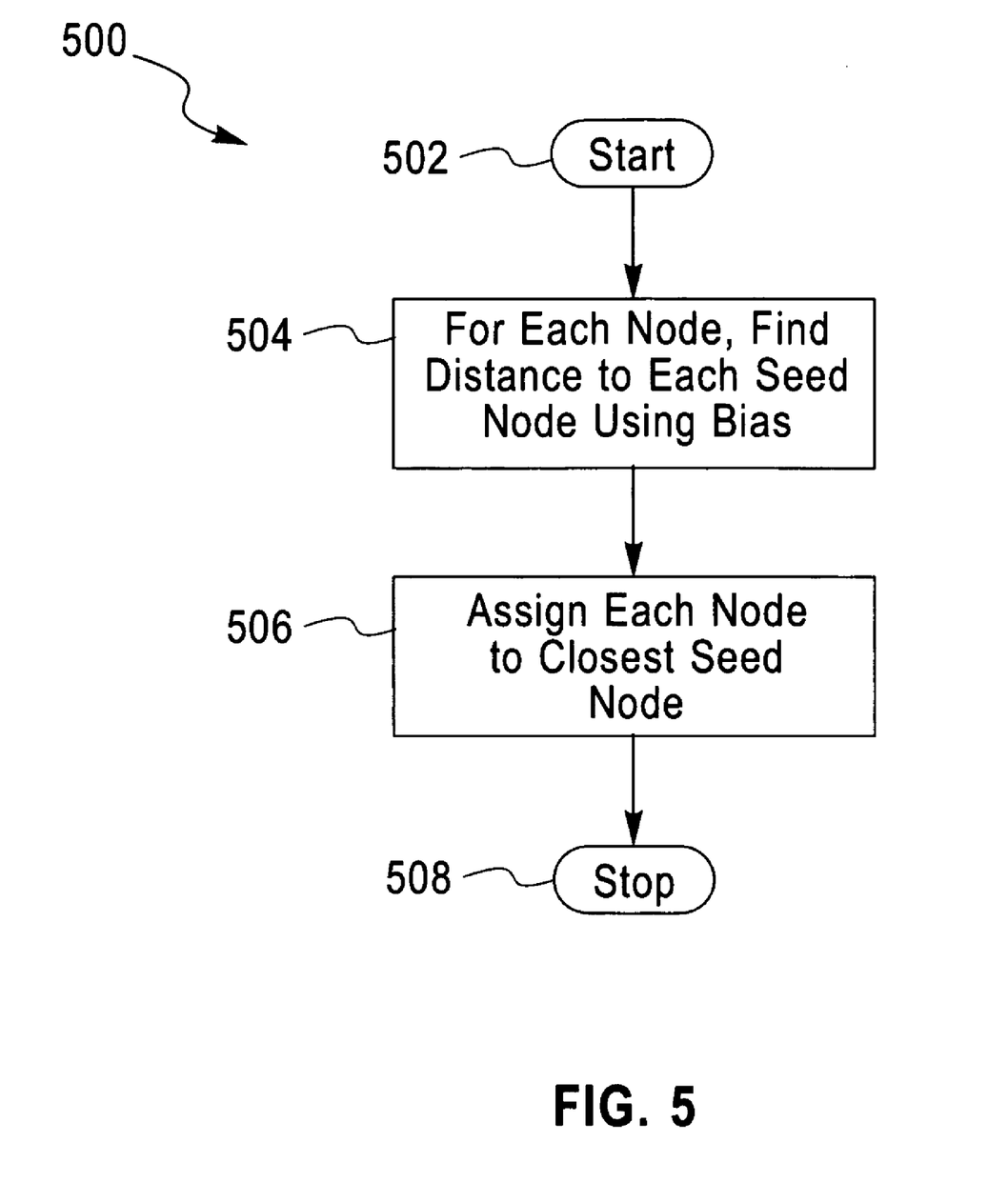
FIG. 5 illustrates a process for assignment of nodes to individual seeds in clusters, according to an embodiment of the invention.

Referring now to FIG. 5, a flow diagram illustrates a process 500 for assignment of nodes to individual seeds in clusters, according to an embodiment of the invention. This can be considered a more detailed description of step 410 of FIG. 4.

The process starts at block 502. In step 504, the process uses the bias to compute the distance to each seed node. We note that the distance function is dependent upon the bias. For example, if the bias is negative, then only the negative weight edges are used to compute the bias. On the other hand, if the bias is positive, then only the positive weight edges are used to compute the bias. In step 506, the process assigns each node to the closest seed node, thus forming clusters around the seed nodes. The process ends at block 508.

Figure 6:
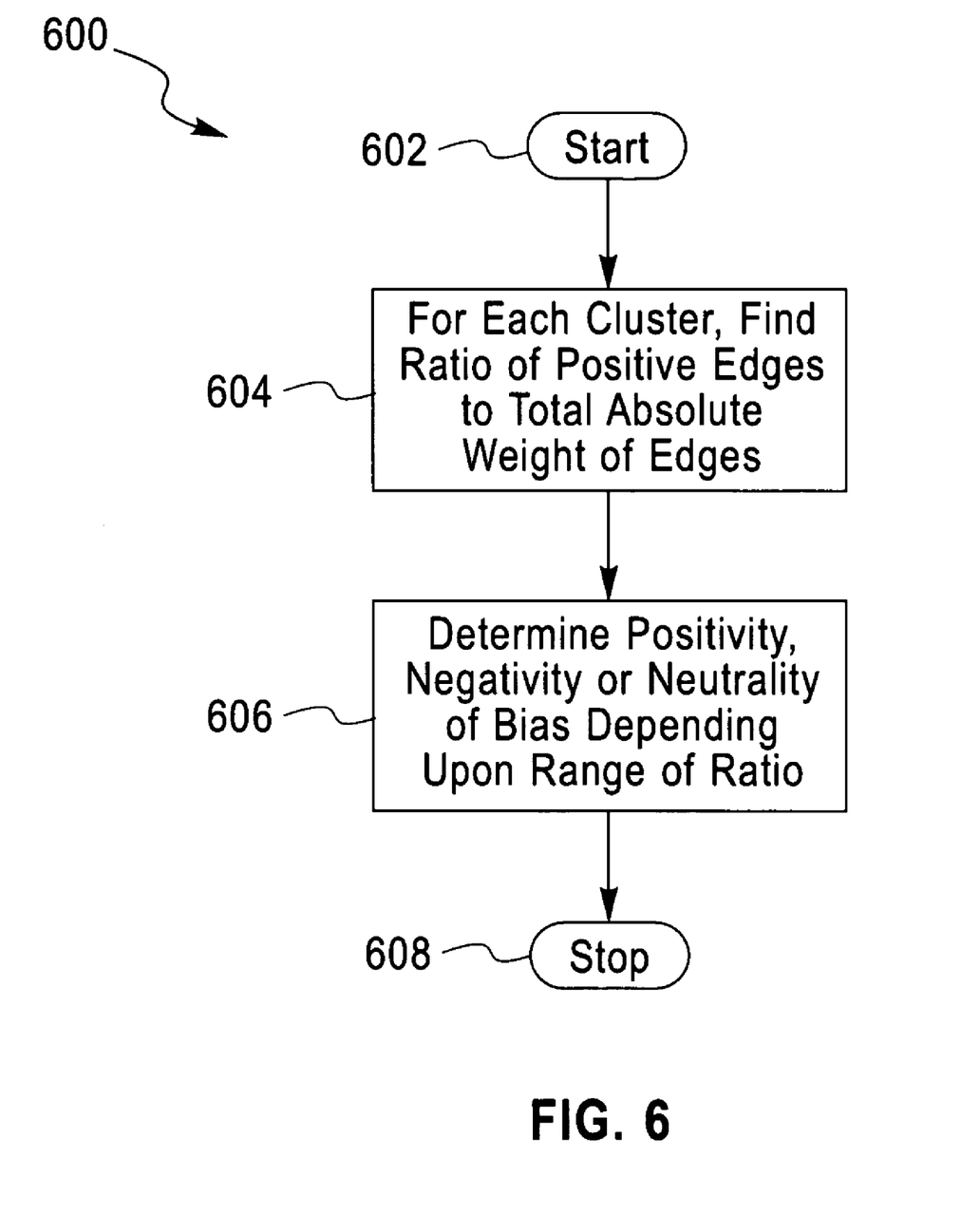
FIG. 6 illustrates a process for computation of biases of individual clusters, according to an embodiment of the invention.

Referring lastly to FIG. 6, a flow diagram illustrates a process 600 for computation of biases of individual clusters, according to an embodiment of the invention. This can be considered a more detailed description of step 412 of FIG. 4. The bias for the clusters is constructed using the relative weights for the different edges in the clusters. Specifically, the process finds the relative weights for the different edges.

The process starts at block 602. In step 604, the process finds the ratio of the positive weight edges to the total absolute weight of the edges in the cluster. If the fraction is below a certain threshold, then the bias is negative, and if the bias is higher than a certain threshold, then the bias is positive. Otherwise the bias is said to be neutral. The positivity, negativity, or neutrality of the bias is determined in step 606. The process ends at block 608.

Advantageously, as described above in illustrative detail, principles of the invention provide for analysis of community evolution in data streams. A method is provided for on-line maintenance of data streams, and the use of these stored snapshots for off-line evolution analysis. Illustrative principles provide clustering methods to generate different kinds of community clusters from the graphical data stream.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for processing data from a data stream, comprising the steps of:
   obtaining a data point of the data stream, the data point representing an interaction event;
   updating on-line an interaction graph based on the data point representing the interaction event associated with the obtained data point of the data stream, wherein the interaction graph represents an interaction model wherein nodes in the interaction graph represent entities and edges in the interaction graph represent interactions between the entities, and the interaction event associated with the obtained data point of the data stream is modeled by a pair of elements comprising a first element corresponding to an edge associated with two entities between whom the interaction event has taken place and a second element corresponding to a weight of the edge that is associated with the interaction which has taken place between the two entities;

storing the updated interaction graph in a nonvolatile memory; and determining off-line an interaction evolution from the updated interaction graph stored in the nonvolatile memory, wherein the off-line determination of the interaction evolution further comprises:

normalizing the updated interaction graph and another time instance of the interaction graph stored in the nonvolatile memory;

forming a differential graph by subtracting the normalized updated interaction graph from the normalized another time instance of the interaction graph;

constructing clusters by assigning nodes to seed nodes, wherein the seed nodes and the assigned nodes of the clusters are selected from the differential graph; and computing a bias for each cluster using a function of a fraction of positive weight edges in the respective cluster;

wherein the bias of each of the clusters is indicative of interaction expansion, interaction contraction or interaction stability.

2. The method of claim 1, wherein the step of updating the interaction graph and storing the updated interaction graph are performed incrementally.

3. The method of claim 1, wherein the step of determining off-line the interaction evolution further comprises clustering data represented in the updated interaction graph stored in the nonvolatile memory.

4. The method of claim 3, wherein the clustering step further comprises using at least one user-specified parameter to construct one or more clusters.

5. The method of claim 4, wherein the at least one user-specified parameter comprises a predefined horizon.

6. The method of claim 5, wherein the clustering step further comprises identifying one or more graphical snapshots based on the predefined horizon and using the one or more graphical snapshots to construct the one or more clusters.

7. The method of claim 4, wherein the clustering step further comprises using one or more seed nodes as representative points of the one or more clusters.

8. The method of claim 7, wherein the clustering step further comprises using the bias of each of the clusters to compute distances between the one or more seed nodes.

9. The method of claim 1, wherein the step of forming a differential graph comprises normalizing the updated interaction graph by dividing each edge weight in the updated interaction graph by a sum of all of the edge weights in the updated interaction graph.

10. An apparatus for processing data from a data stream, comprising:

a main memory; and at least one processor coupled to the main memory and operative to:

(i) obtain a data point of the data stream, the data point representing an interaction event;

(ii) update on-line an interaction graph based on the data point representing the interaction event associated with the obtained data point of the data stream, wherein the interaction graph represents an interaction model wherein nodes in the interaction graph represent entities and edges in the interaction graph represent interactions between the entities, and the interaction event associated with the obtained data point of the data stream is modeled by a pair of elements comprising a first element corresponding to an edge associated with two entities between whom the interaction event has taken place and a second element corresponding to a weight of the edge that is associated with the interaction which has taken place between the two entities;

(iii) store the updated interaction graph in a nonvolatile memory; and (iv) determine off-line an interaction evolution from the updated interaction graph stored in the nonvolatile memory, wherein the off-line determination of the interaction evolution further comprises:

normalizing the updated interaction graph and another time instance of the interaction graph stored in the nonvolatile memory;

forming a differential graph by subtracting the normalized updated interaction graph from the normalized another time instance of the interaction graph;

constructing clusters by assigning nodes to seed nodes, wherein the seed nodes and assigned nodes of the clusters are selected from the differential graph; and computing a bias for each cluster using a function of a fraction of positive weight edges in the respective cluster;

wherein the bias of each of the clusters is indicative of interaction expansion, interaction contraction or interaction stability.

11. The apparatus of claim 10, wherein the operation of updating the interaction graph and storing the updated interaction graph are performed incrementally.

12. The apparatus of claim 10, wherein the operation of determining off-line the interaction evolution further comprises clustering data represented in the updated interaction graph stored in the nonvolatile memory.

13. The apparatus of claim 12, wherein the clustering operation further comprises using at least one user-specified parameter to construct one or more clusters.

14. The apparatus of claim 13, wherein the at least one user-specified parameter comprises a predefined horizon.

15. The apparatus of claim 14, wherein the clustering operation further comprises identifying one or more graphical snapshots based on the predefined horizon and using the one or more graphical snapshots to construct the one or more clusters.

16. The apparatus of claim 13, wherein the clustering operation further comprises using one or more seed nodes as representative points of the one or more clusters.

17. The apparatus of claim 16, wherein the clustering operation further comprises using the bias of each of the clusters to compute distances between the one or more seed nodes.

18. The apparatus of claim 10, wherein the operation of forming a differential graph comprises normalizing the updated interaction graph by dividing each edge weight in the updated interaction graph by a sum of all of the edge weights in the updated interaction graph.

19. An article of manufacture for use in processing data from a data stream, the article comprising a processor readable storage medium containing one or more programs which when executed implement the steps of:

obtaining a data point of the data stream, the data point representing an interaction event;

updating on-line an interaction graph based on the data point representing the interaction event associated with the obtained data point of the data stream, wherein the interaction graph represents an interaction model wherein nodes in the interaction graph represent entities and edges in the interaction graph represent interactions between the entities, and the interaction event associated with the obtained data point of the data stream is modeled by a pair of elements comprising a first element corresponding to an edge associated with two entities between whom the interaction event has taken place and a second element corresponding to a weight of the edge that is associated with the interaction which has taken place between the two entities;

storing the updated interaction graph in a nonvolatile memory; and determining off-line an interaction evolution from the updated interaction graph stored in the nonvolatile memory, wherein the off-line determination of the interaction evolution further comprises:

normalizing the updated interaction graph and another time instance of the interaction graph stored in the nonvolatile memory;

forming a differential graph by subtracting the normalized updated interaction graph from the normalized another time instance of the interaction graph;

constructing clusters by assigning nodes to seed nodes, wherein the seed nodes and assigned nodes of the clusters are selected from the differential graph and;

computing a bias for each cluster using a function of a fraction of positive weight edges in the respective cluster;

wherein the bias of each of the clusters is indicative of interaction expansion, interaction contraction or interaction stability.

20. The article of manufacture of claim 19, wherein the step of determining off-line the interaction evolution further comprises clustering data represented in the updated interaction graph stored in the nonvolatile memory.

21. The article of manufacture of claim 19, wherein the step of forming a differential graph comprises normalizing the updated interaction graph by dividing each edge weight in the updated interaction graph by a sum of all of the edge weights in the updated interaction graph.

* * * * *